United States Patent Office 2,717,785
Patented Sept. 13, 1955

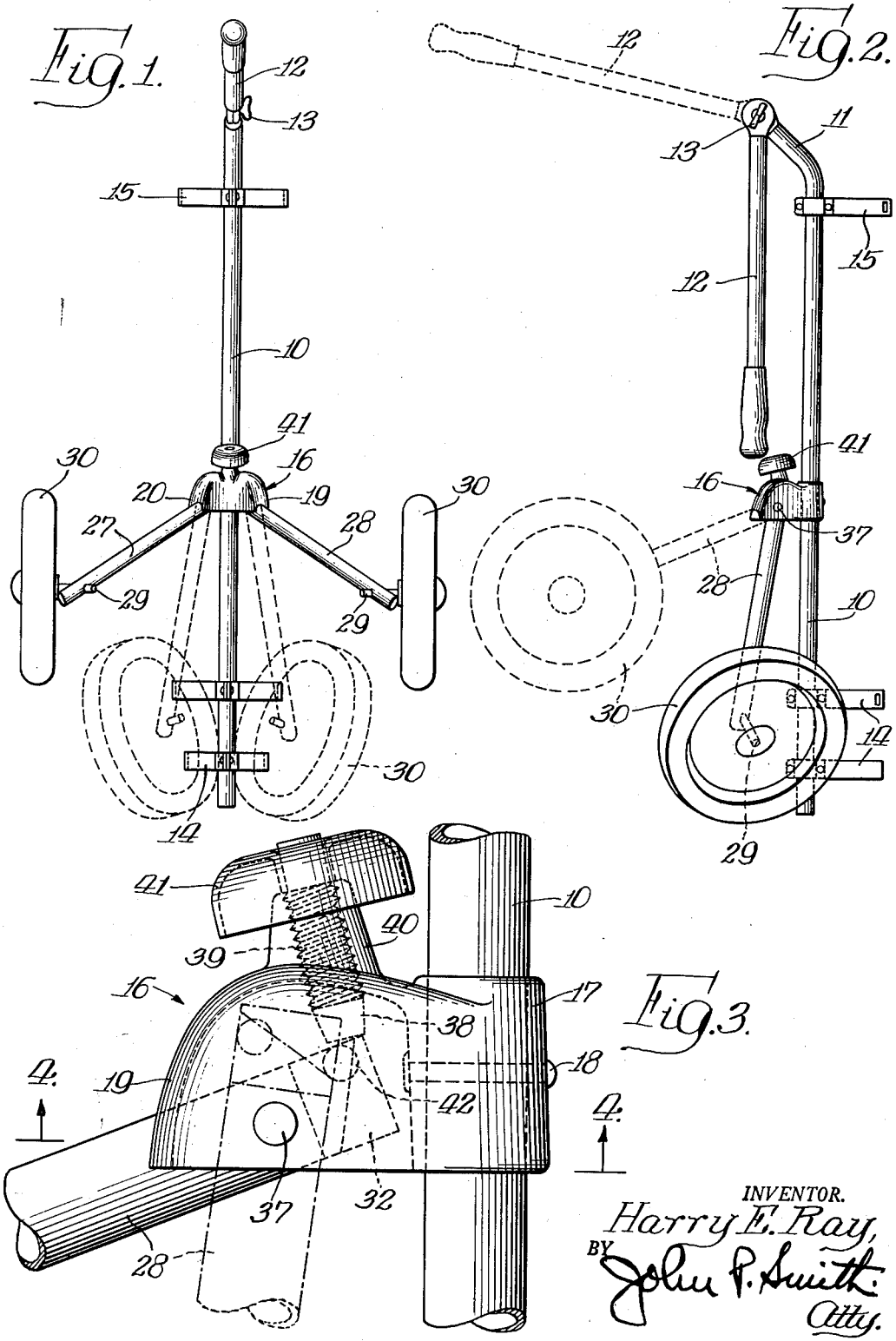

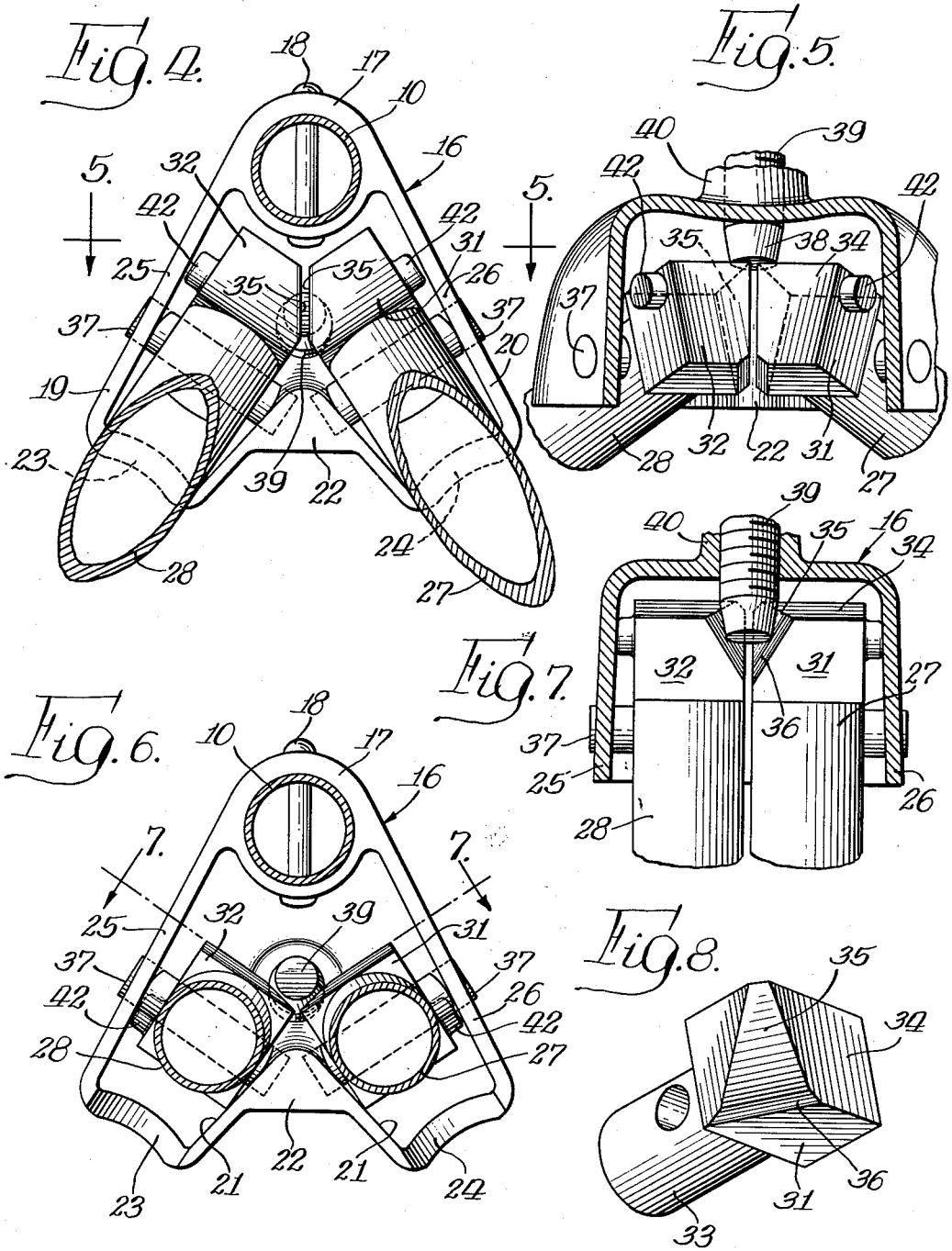

2,717,785

COLLAPSIBLE GOLF BAG CARRIER

Harry E. Ray, Chicago, Ill.

Application May 19, 1953, Serial No. 355,970

5 Claims. (Cl. 280—41)

One of the primary objects of the present invention is to provide a novel, improved and rigid type of collapsible golf bag carrier or cart which can be readily extended to operative position or collapsed into folded position for storage in a locker or trunk of an automobile.

Heretofore numerous attempts have been made to provide a satisfactory collapsible golf bag cart which will withstand rugged or abusive use from the users thereof. In almost every instance it has been found with the devices heretofore constructed that the hinged portions of the collapsible type golf bag carrier, as well as the operating parts thereof, become loosened or worn at the joints after a short use so as to render the carrier unstable or results in breakage of the parts thereof so that the same is no longer fit for use. It is therefore one of the primary objects of the present invention to not only overcome the objections to the golf bag carriers heretofore manufactured, but to provide a very substantial and stable construction in which a vise-like clamp positively locks the wheel arms of the frame in the extended position so that the carrier will withstand extraordinary abuse and usage.

A further object of the invention is to provide a novel and improved construction of golf bag carrier in which a simple clamping screw rigidly retains and supports the wheels in an operative position and will continue to do so even if looseness or play occurs in the pivot connections of the parts.

A further object of the invention is to provide a novel and improved as well as simplified construction of golf bag cart in which a single screw member performs the function of locking the wheel legs or arms in either of two positions.

A still further object of the invention is to provide a novel and improved construction of a golf bag cart in which camming means are employed to actuate the wheel legs or arms laterally on their respective pivoted pins so as to properly position the beveled surface of the locking blocks to effectively lock the cart in its extended or operative position and to yieldingly lock the rubber wheels against the main frame in its folded position.

These and other objects are accomplished by providing a construction and an arrangement of the various parts in the manner hereinafter described and particularly pointed out in the appended claims.

Referring to the drawings:

Fig. 1 is a front elevational view of my improved collapsible golf bag carrier in which the wheels are shown in extended or operative position in full lines and in collapsed folded position in broken lines;

Fig. 2 is a side elevational view of the same;

Fig. 3 is an enlarged fragmentary side elevational view of the saddle bracket and the clamping or locking means showing the manner in which the wheel arms are locked in extended position;

Fig. 4 is an enlarged cross sectional view taken on the line 4—4 in Fig. 3;

Fig. 5 is an enlarged cross sectional view taken on the lines 5—5 in Fig. 4;

Fig. 6 is an enlarged horizontal cross sectional view showing the manner in which the clamping screw locks the wheel arms in collapsed position or in the position shown in full lines in Fig. 2;

Fig. 7 is an enlarged cross sectional view taken on the lines 7—7 in Fig. 6; and Fig. 8 is an enlarged perspective view of one of the clamping blocks.

In illustrating one form which my invention may assume in practice, I have shown the same as comprising a main frame or tubular member 10 which has its upper end bent slightly forward as shown at 11. Pivotally connected to the upper end of the tubular member 10 is a draft arm or hand lever 12 secured by a clamping hand screw 13. The lower portion of the frame member 10 is provided with two conventional type golf bag supporting brackets 14 and an upper bag supporting bracket 15. Secured intermediate the ends of the frame 10 is a saddle bracket, generally indicated by the reference character 16. This saddle bracket 16 has a vertically extending sleeve-like portion 17 which is adapted to receive the tubular or frame member 10 and is secured thereto by a transverse rivet 18. The saddle bracket 16 also includes outwardly diverging dome-like arms 19 and 20. These dome-like arms are hollowed out, as shown at 21 and are connected by an intermediate wall 22. The forward ends of the dome-like arms 19 and 20 have arcuate recesses, as shown at 23 and 24 respectively, so as to form seats for the wheel arms hereinafter described. The outer walls of the dome-like arms 19 and 20 converge, as shown at 25 and 26 respectively, so as to lie tangent with the sleeve portion 17 of the saddle bracket 16. The inner surfaces of these walls 25 and 26 perform a cam-like action to actuate or move the wheel legs inwardly when the legs are folded to their collapsed position in the manner hereinafter more fully described. Wheel arms 27 and 28 are pivoted to the saddle bracket at their inner ends and are provided with wheel spindles 29 at their lower ends on which are journaled the usual rubber tired wheels 30. Telescopically mounted in the upper ends of each of the wheel arms 27 and 28 are right and left hand locking blocks 31 and 32. These locking blocks have shaft-like extensions 33 which are adapted to be telescopically mounted in the tubular arms 27 and 28 and secured therein by any well known means. Formed integrally with each of the shaft-like portions 33 is a substantially cube-like block 34. One corner of each of the cubical blocks 34 has a triangular tapered portion, as shown at 35, which is substantially triangular in form with the lower portion thereof beveled as shown at 36. (See Fig. 8 of the drawings.) These blocks are right and left handed and their complementary wheel arms 27 and 28 are pivotally mounted in the saddle 16 by transverse pins 37 which respectively extend through the aligned apertures in the walls 26 and 25 and the division wall 22 of the saddle bracket 16, as clearly shown in Figs. 6 and 7 of the drawings. When the wheel arms 27 and 28 are in their extended or operative position, or the position shown in full lines in Fig. 1, they are nested in the arcuate recesses or seats 23 and 24 of the bracket 16 and when in this position, the tapered triangular sides 35 of the opposite blocks 32 lie in parallelism as clearly shown in Figs. 4 and 5 of the drawings so that a tapered end 38 of a clamping screw 39 will effectively engage the opposite blocks 31 and 32 and clamp the arms 27 and 28 in their arcuate seats 23 and 24 of the saddle bracket 16. The clamping screw 39 is mounted in threaded engagement with an internally threaded boss 40 extending upwardly and formed integrally with the saddle bracket 16. The clamping screw 39 is provided with a circular hand grip as shown at 41. The clamping blocks 31 and 32 and the respective wheel arms 27 and 28 are laterally movable on their respective pivot pins 37 and are actuated inwardly toward one another by laterally projecting lugs 42 which are secured to or formed integrally with the blocks 31 and 32. In the operation of actuating or swinging the wheel arms 27 and 28 from their extended position or the position shown in full lines in Fig. 1 of the drawings to the folded position as shown in broken lines in the same figure, these lugs 42 engage the inner faces of the walls 25 and 26 of the saddle bracket 16 and through the camming action of this engagement, urges these blocks 32 towards one another from the position shown in Fig. 4 to the position shown in Figs. 6 and 7 of the drawings. In this position the tapered end 38 of the clamping screw 39 will engage the beveled surfaces 36 of each of the blocks 31 and 32 to thereby clamp the arm legs 27 and 28 so that the rubber tired wheels thereof yieldingly engage the lower end of the main frame 10 of the cart. When the clamping screw 39 is withdrawn sufficiently, the wheel arms 27 and 28 may be extended to their operative position, in which case the blocks and their respective arms will move outwardly and laterally until the arms 27 and 28 are seated in the arcuate recesses 23 and 24 of the saddle bracket 16 and upon turning the locking screw so as to move the same inwardly the tapered end 38 thereof will then engage the flat top surfaces of the blocks 31 and 32 to rigidly clamp the wheel arms in their extended position.

Summarizing the advantages and functions of operation of my improved and simplified construction of golf bag cart, it will be readily understood that the number of movable parts are reduced to a minimum, there being only three in number, and that by positively locking the movable wheel arms by a clamping screw, the vise-like rigidity to these movable parts will readily secure these parts in position even in the case of where the pivots of joints may become loosened by reason of wear or otherwise. The clamping screw will therefore compensate for any such variation or wear of the operating parts.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. A golf bag carrier comprising a frame member, a saddle bracket secured to said frame member, wheel arms pivotally mounted on said saddle bracket, carrying wheels journaled on the outer ends of said arms, means carried by said arms and engageable with said saddle bracket for actuating said arms axially on their respective pivots, and clamping means carried by said saddle bracket and operatively related to said arms for rigidly locking said arms in extended or collapsed position.

2. A golf bag carrier comprising a frame member, a saddle bracket secured to said frame member, camming means carried by said bracket wheel arms pivotally mounted on said saddle bracket, carrying wheels journaled on the outer ends of said arms, means carried by said arms and engageable with said camming means for actuating said arms axially on their respective pivots, and a clamping screw mounted in threaded engagement with said saddle bracket and engageable with the inner ends of said arms for locking said arms in extended position.

3. A golf bag carrier comprising a frame member, a saddle bracket secured to said frame member, inclined sides formed on said bracket, wheel arms pivotally mounted on said saddle bracket, carrying wheels journaled on the outer ends of said arms, means carried by said arms and engageable with the inclined sides of said saddle bracket for actuating said arms laterally, locking blocks secured to the inner ends of said arms, beveled surfaces formed on the adjacent portions of said blocks, and a clamping screw mounted in threaded engagement with said saddle and engageable with said blocks for locking said arms in extended position.

4. A golf bag carrier comprising a tubular frame member, a bracket secured intermediate the ends of said member, said bracket having two divergent semi-circular recesses therein, wheel arms pivoted to said bracket and adapted to be seated in said recesses when said arms are in their extended positions, cam blocks secured to the inner ends of said arms and having beveled surfaces in opposed faces to permit free movement of said arms on their respective pivots, lugs carried by said blocks and engageable with said bracket for actuating said arms axially on their respective pivots, wheels journaled on the outer ends of said arms, and a clamping member adjustably mounted on said bracket and engageable with said blocks for locking said arms in extended position.

5. A golf bag carrier comprising a tubular frame member, a bracket secured intermediate the ends of said member, said bracket having two divergent semi-circular recesses therein, wheel arms pivoted to said bracket and adapted to be seated in said recesses when said arms are in their extended positions, said wheel arms being movable axially on their respective pivots, cam blocks secured to the inner ends of said arms and having beveled surfaces in opposed faces to permit free movement of said arms on their respective pivots, wheels journaled on the outer ends of said arms, and a clamping screw mounted in threaded engagement with said bracket and engageable with the beveled surfaces of said blocks for locking said arms in various positions.

References Cited in the file of this patent

UNITED STATES PATENTS

| D. 166,464 | Gunning | Apr. 15, 1952 |
| 507,178 | Smith | Oct. 24, 1893 |
| 1,593,415 | Perkins | July 20, 1926 |
| 2,476,718 | Foley | July 19, 1949 |
| 2,599,354 | Stableford | June 3, 1952 |

FOREIGN PATENTS

| 93,491 | Germany | Aug. 18, 1897 |